Oct. 30, 1928.  
I. E. HILLER  
1,689,342  
MACHINE FOR SPREADING SAND, GRAVEL, ETC  
Original Filed May 18, 1925   2 Sheets-Sheet 1
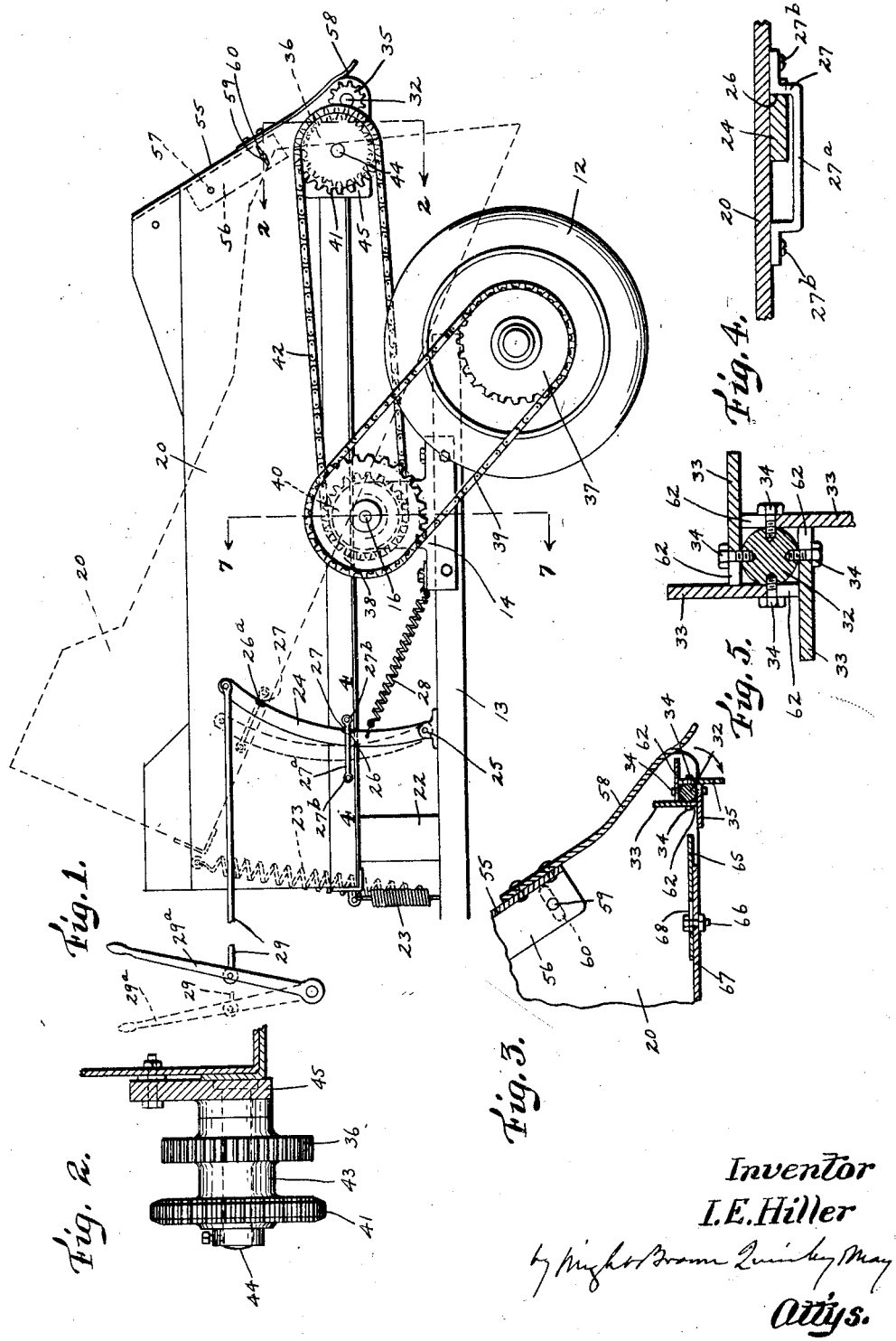
Inventor  
I. E. Hiller Oct. 30, 1928.
I. E. HILLER
1,689,342
MACHINE FOR SPREADING SAND, GRAVEL, ETC
Original Filed May 18, 1925   2 Sheets-Sheet 2
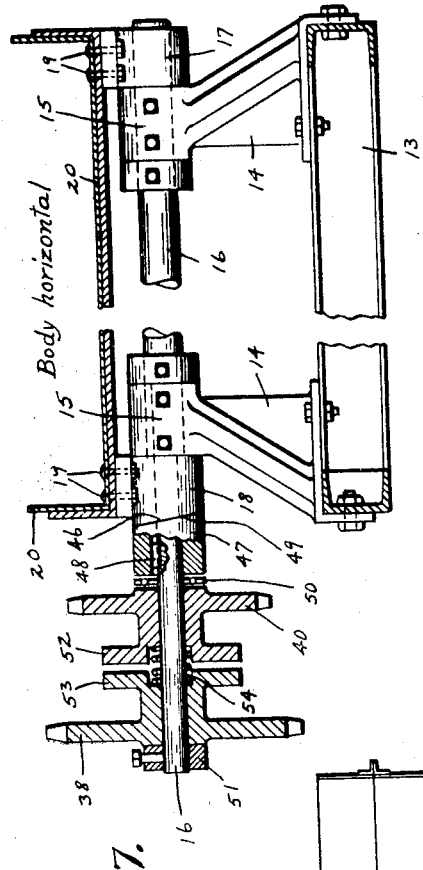
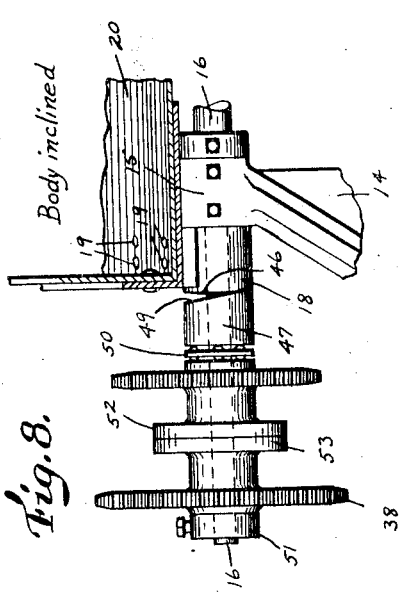
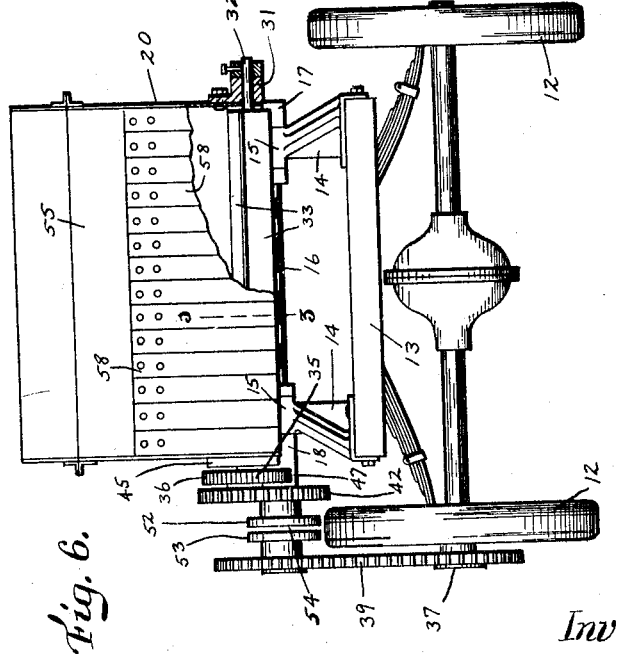
Inventor
I. E. Hiller
by Wright, Brown, Quinby & May
Attys.

Patented Oct. 30, 1928.

1,689,342

UNITED STATES PATENT OFFICE.

ISAAC E. HILLER, OF MARION, MASSACHUSETTS.

MACHINE FOR SPREADING SAND, GRAVEL, ETC.

Original application filed May 18, 1925, Serial No. 110,041. Divided and this application filed December 14, 1926. Serial No. 154,675.

This invention relates to scattering unloading mechanism for a vehicle having a dumping body, and has for its chief object to provide means for automatically rendering said mechanism operative by a dumping movement of the body, and inoperative by a return of the body to a horizontal or nondumping position.

Of the accompanying drawings forming a part of this specification,—

Figure 1 is a side elevation of a motor truck adapted in accordance with my invention to spread loose material.

Figure 2 is a fragmentary section on line 2—2 of Figure 1.

Figure 3 is a section on line 3—3 of Figure 6.

Figure 4 is a section on line 4—4 of Figure 1.

Figure 5 is an enlargement of a portion of Figure 3.

Figure 6 is a rear elevation, parts being shown in section.

Figure 7 is a section on line 7—7 of Figure 1, the body being horizontal.

Figure 8 is a view similar to Figure 7, the body being inclined and certain parts shown in section in Figure 7, being shown in elevation.

The same reference characters indicate the same parts in all of the figures.

In the drawings 12, 12 designate the driving rear wheels of a motor truck, and 13 designates the chassis supported, as usual, by the driving-wheels and by the steering forward wheels (not shown).

Fixed to the longitudinal side bars of the chassis are upwardly projecting standards 14, 14, having sockets 15, (Figure 7), through which extends a transverse horizontal shaft 16, fixed to the sockets by set screws or the like, and constituting a pivotal support or axis on which bearing blocks 17 and 18, fixed by bolts 19 to the bottom of the load-carrying and dumping body 20, are mounted to turn, so that the body may be oscillated on the fixed shaft 16, and assume the horizontal carrying position shown by full lines in Figure 1, and the inclined or tilted dumping position shown by dotted lines. The bearing blocks 17 and 18 turn on the fixed axis with the body, and the block 18 is formed to act as a clutch-closing cam, for a purpose hereinafter stated, when the body is tilted. The rearward projection of the body 20 from the fixed axis 16, is greater than its forward projection from said axis, so that when the body is horizontal, the center of gravity of the body and of a load carried thereby, is at the rear of the fixed axis.

The chassis is provided with an upwardly projecting support or stop 22, on which the forward end portion of the body bears, when the body is horizontal, the stop and the fixed axis conjointly supporting the body in a horizontal position. The forward end of the body is normally held against the stop 22, by yielding holding-down means, preferably embodied in contractile springs 23, fixed to the body and to the chassis, as shown by Figure 1, the contractile force of said springs being sufficient to hold the forward end of the body down upon the stop 22, when the body is not loaded. When the body is loaded, the location of the center of gravity behind the fixed axis causes the excess weight of the rear portion of the body and load to tilt the body to a dumping or delivering position, when this action is permitted, as next described.

The machine is provided with locking means adapted to positively hold the forward end of the body on the stop 22, so that whether the body is loaded or not, its forward end cannot rise until the locking means is operated by the driver to release the forward end of the body. Said locking means in the embodiment of the invention here shown, includes a movable locking arm 24, pivoted at 25 to the chassis and provided with a notch 26, adapted to engage a fixed detent 27 on the body, the locking arm being caused to automatically engage the detent by a spring 28, fixed at one end to the chassis and at its other end to the locking arm, as shown by Figure 1. The releasing means operable by the driver, is embodied in a rod 29 jointed to the free end of the locking arm and extending forward to the driver's station, where it is connected with a release lever 29ª operable by the driver to release the locking arm from the detent.

If the body is loaded when this release is effected, the body is tilted. The locking arm is provided with an upper notch 26ª near its free end, which engages the detent 27 when the body is inclined, so that the body remains tilted until the load is entirely discharged, and until the locking arm is again moved forward by the driver, thus permitting the pulling-down springs 23 to restore the body to its horizontal position. Provision is therefore made for preventing the pulling down of the forward end of the body by the springs 23, until the last remnant of the load has been discharged, a movement of the release lever being then required to permit the springs 23 to restore the body to its horizontal position.

The detent 27 may be a portion of an angular rod or bar 27ᵃ secured at its ends to the body at 27ᵇ.

The structure thus far described is described and claimed by my application entitled Improvement in machines for spreading sand, gravel, etc., filed May 18, 1925, Serial No. 110,041, of which the present application is a division.

I will now describe the scattering unloading mechanism constituting the subject matter of this divisional application.

Journaled in bearings 31, fixed to the rear end of the body at opposite sides thereof, is a shaft 32, constituting an element of a rotary feeder, adapted to control the discharge of gravel, etc., from the body. Said feeder, in this instance, includes blades 33, tangential to the shaft 32, and secured thereto by bolts 34. The feeder is located between the rear end of the bottom of the body and an end gate, preferably constructed as hereinafter described, and adapted to cooperate with the feeder in permitting a regulated delivery of the material.

To one end of the feeder shaft 32 is fixed a gear 35, meshing with a feeder driving gear 36, which is driven in the direction indicated by the arrow in Figure 3, by connections between it and the rear axle of the truck. Said connections preferably include a sprocket wheel 37, fixed to the rear axle, an outer sprocket wheel 38, journaled to rotate on the fixed shaft or axis 16, a chain 39 connecting said wheels, an inner sprocket wheel 40, journaled to rotate on the axis 16, beside the outer wheel 38, a sprocket wheel 41, fixed to and coaxial with the larger gear 36, and a sprocket chain 42, connecting the sprocket wheels 40 and 41. The sprocket wheel 41 and gear 36 are fixed to a single hub 43, which is mounted to rotate on a stud 44 (Figure 2), fixed to a holder 45, bolted to one side of the body.

The sprocket wheels 38 and 40 on the axle 16, are automatically disconnected from each other when the body assumes a horizontal position and are automatically connected with each other, only when the body is tilted to dumping position, so that the feeder is rotated only when the material is caused to gravitate toward it by the inclination of the body. This automatic disconnection and connection are caused by the means next described.

The bearing block 18, fixed to the body and adapted to turn on the fixed axis 16, is provided with an oblique end face 46, which I call a cam face, the same having the effect of a cam, when the block is turned on the axis 16, by the inclination of the body. 47 designates a collar slidable on the axis 16, and engaged therewith by a key 48 (Figure 4), so that rotation of the collar is prevented. The collar has an oblique end face or cam face 49, with which the cam face 46 is parallel when the body is horizontal. The inclination of the body to its dumping position causes the cam face 46 of the bearing block 18 to force the collar 47 endwise to the left from the position shown by Figure 7. The collar 47 is contiguous to the inner sprocket wheel 40, and when thus forced endwise, acts through an anti-friction thrust-bearing 50, on the hub of said sprocket wheel, to force it laterally on the axle 16, toward the outer sprocket wheel 38, the hub of which bears on a stop collar 51, fixed to the axis 16.

The inner sprocket wheel 40 is provided with an inner clutch member 52, and the outer sprocket wheel 38 with a complemental outer clutch member 53. A spring 54 interposed between said members normally forces them apart, by pressing the inner member 52 away from the outer member 53, as shown by Figure 7. The arrangement is such that when the body is horizontal, the clutch members are separated, so that the feeder is not driven, and when the body is inclined to its dumping position, the clutch member 52 is forced into clutching engagement with the clutch member 53, as shown by Figure 8, so that the feeder is driven.

The end gate above mentioned, is preferably composed of an upper body portion 55, extending across the body and having ears 56, pivoted at 57 to the body sides, and spring tongues 58, fixed at their upper ends to the body portion, their free ends forming one side of an opening in which the feeder is located, as shown by Figure 3. The end gate may be swung on the pivots 57 to adjust the free ends of the tongues 58, toward or from the feeder, and confined by screws 59, entering slots 60 (Figure 1) on the ears 56. The feeder blades 33 may be provided with slots 62, receiving the bolts 34, and permitting adjustment of the blades to vary the projection of their outer edges from the shaft. Provision is therefore made for varying the thickness of a layer of material deposited on the ground when the machine is in operation.

The body is loaded while its forward end is locked against the stop 22, and is therefore horizontal. The machine may now be operated to transport the load to the location where it is to be used. When this location is reached, the driver moves the release lever 29ᵃ to disengage the locking arm 24 from the detent 29, thus permitting the tilting of the body by its unbalance load, the holding-down springs 23 yielding, as indicated by dotted lines in Figure 1. The feeder is now rendered operative, as above described, to feed a layer of material of predetermined thickness, from the rear end of the body. The upper notch 26ª of the locking arm engages the detent 27 on the body, when the latter reaches its delivering position, so that the body is again locked and cannot be pulled down by the springs 23, until the driver again operates the release lever 29ª. Provision is therefore made for discharging the entire load, before the forward end of the body is pulled down by the springs 23. After the complete discharge of the load, the driver may again disengage the locking arm 24 from the detent 27, thus permitting the springs 23 to restore the body to its horizontal position, in which it is again locked by the locking arm. It will be seen that the driver is enabled to cause the described operation of the machine without leaving his seat.

The rear end portion of the bottom of the body, forming one edge of an opening in which the feeder is located, is preferably adjustable, and formed by a plate 65, secured by bolts 66 to the fixed portion 67 of the bottom, the plate 65 being provided with slots 68, receiving the bolts 66, and permitting adjustment of the plate toward and from the axis of the feeder. The depth or thickness of a layer of material deposited on the ground by the machine, may be varied, as desired, by suitably adjusting the feeder blades 33, the plate 65, and the end gate having the spring tongues 58. The free end portions of the tongues form one side of said opening, and each tongue is adapted to yield independently, to permit the passage of the larger pieces of material between the tongues and the feeder.

I claim:

1. A spreading machine comprising a motor vehicle, a load-carrying body, means connecting the body with the vehicle and including a shaft fixed to the chassis, and bearing blocks fixed to the body and adapted to turn on the shaft, a rotary feeder at the rear end of the body, and driving mechanism connecting said feeder with the driving axle of the vehicle, said mechanism including clutch members rotatable on the fixed shaft, one member being slidable, a cam face on one of said blocks, and a cam-faced sleeve keyed to and slidable on the shaft, and interposed between the bearing block and the slidable clutch member, the arrangement being such that when the body is tilted, the bearing-block and sleeve exert pressure on the slidable member and render the clutch operative, and when the body is horizontal, the pressure is relaxed and the clutch rendered inoperative.

2. A spreading machine comprising a motor vehicle, a load-carrying body, means connecting the body with the vehicle chassis and permitting the body to tilt on a transverse axis, a rotary feeder at the rear end of the body, driving mechanism connecting said feeder with the driving axle of the vehicle, said mechanism including inner and outer clutch members coaxial with the body, the inner member being slidable, sprocket wheels fixed to said clutch members, driving connections between the sprocket wheel of the outer clutch member and the rear axle, driving connections between the sprocket wheel of the inner clutch member and the feeder, and means operable by movements of the body for connecting the clutch members when the body is tilted, and disconnecting the same when the body is horizontal.

3. A spreading machine comprising a motor vehicle, a load-carrying body, means connecting the body with the vehicle chassis and including a shaft fixed to the chassis, and bearing blocks fixed to the body and adapted to turn on the shaft, a rotary feeder at the rear end portion of the body, feeder-operating mechanism including an outer clutch member rotatable on the fixed shaft, an inner clutch member slidable on the shaft, a spring normally separating said clutch members, a gear fixed to the feeder, a sprocket-wheel fixed to the rear axle, driving connections between the axle sprocket-wheel and the outer clutch member, driving connections between the inner clutch member and the feeder gear, a cam-face on one of said bearing blocks, and a cam-faced sleeve slidable and non-rotatable on the fixed shaft and interposed between said bearing block and the inner clutch member, the arrangement being such that a movement of the body to a tilted position causes pressure of the collar against the inner clutch member, to render the clutch operative, while movement of the body to a horizontal position permits separation of the clutch member by the spring to render the clutch inoperative.

4. A spreading machine comprising a motor vehicle, a tiltable load-carrying body, body-supporting means including a transverse shaft fixed to the vehicle chassis, and bearing blocks fixed to the body and adapted to turn on the shaft and thus permit the tilting of the body, a rotary feeder at the rear end of the body, and feeder-driving mechanism connecting the feeder with the driving axle of the vehicle and including an outer clutch member rotatable on the shaft and connected with the driving axle, an inner clutch member slidable and rotatable on the shaft, and connected with the feeder, the inner member being normally separated from the outer member when the body is horizontal, so that the driving mechanism is inoperative, a cam face on one of the body blocks, and a cam-faced collar slidable and non-rotatable on the fixed shaft, and interposed between the said bearing block and the inner clutch member, the arrangement being such that the tilting of the body causes pressure of the collar against the inner clutch member to connect the clutch members.

In testimony whereof I have affixed my signature.

ISAAC E. HILLER.